United States Patent
Rouleau

(10) Patent No.: US 7,310,342 B2
(45) Date of Patent: Dec. 18, 2007

(54) AUTO ATM-VC DETECTION FOR ATM NETWORK ACCESS DEVICES

(75) Inventor: Gordon Rouleau, Rosemere (CA)

(73) Assignee: Dialogic Corporation, Vancouver, BC (CA)

( * ) Notice: Subject to any disclaimer, the term of this patent is extended or adjusted under 35 U.S.C. 154(b) by 1001 days.

(21) Appl. No.: 10/400,412

(22) Filed: Mar. 28, 2003

(65) Prior Publication Data

US 2003/0210698 A1    Nov. 13, 2003

Related U.S. Application Data

(63) Continuation-in-part of application No. PCT/CA00/01418, filed on Nov. 29, 2000.

(30) Foreign Application Priority Data

Sep. 29, 2000    (WO) .................. PCT/CA00/01126

(51) Int. Cl.
*H04L 12/28* (2006.01)
(52) U.S. Cl. .................. 370/397; 370/399; 370/395.3
(58) Field of Classification Search .................. None
See application file for complete search history.

(56) References Cited

U.S. PATENT DOCUMENTS 5,659,540 A * 8/1997 Chen et al. .................. 370/249
5,737,312 A * 4/1998 Sasagawa .................. 370/232
6,868,066 B1 * 3/2005 Fujita .................. 370/236.2
6,993,048 B1 * 1/2006 Ah Sue .................. 370/493

FOREIGN PATENT DOCUMENTS

EP    1 009 133    6/2000

* cited by examiner

*Primary Examiner*—Chau Nguyen
*Assistant Examiner*—Jung Park
(74) *Attorney, Agent, or Firm*—Lowrie, Lando & Anastasi, LLP

(57) ABSTRACT

The system and method allow Customer Premises Equipment Network Access Devices using ATM as a datalink layer transport, to automatically determine what VC addresses are supported by the remote Network Access Concentrator end of the physical connection. A "divide and conquer" approach is used to ping as quickly as possible the most likely VPI/VCI values. The VC discovery mechanism attempts to discover active VP's and pings only VC's on these VP's. If there are no VP replies, it pings VC's to a limited VCI depth covering the entire VP range. The maximum predetermined range of VC's to ping (MAX-PING) and the physical upstream line speed determines the overall amount of time required by this procedure. Direct benefits of the proposed approach include: time and money saved by not having to customize the firmware in each NAD destined for particular Network Service Providers, and improved end-user experience by providing plug-and-play convenience out of the box.

18 Claims, 4 Drawing Sheets

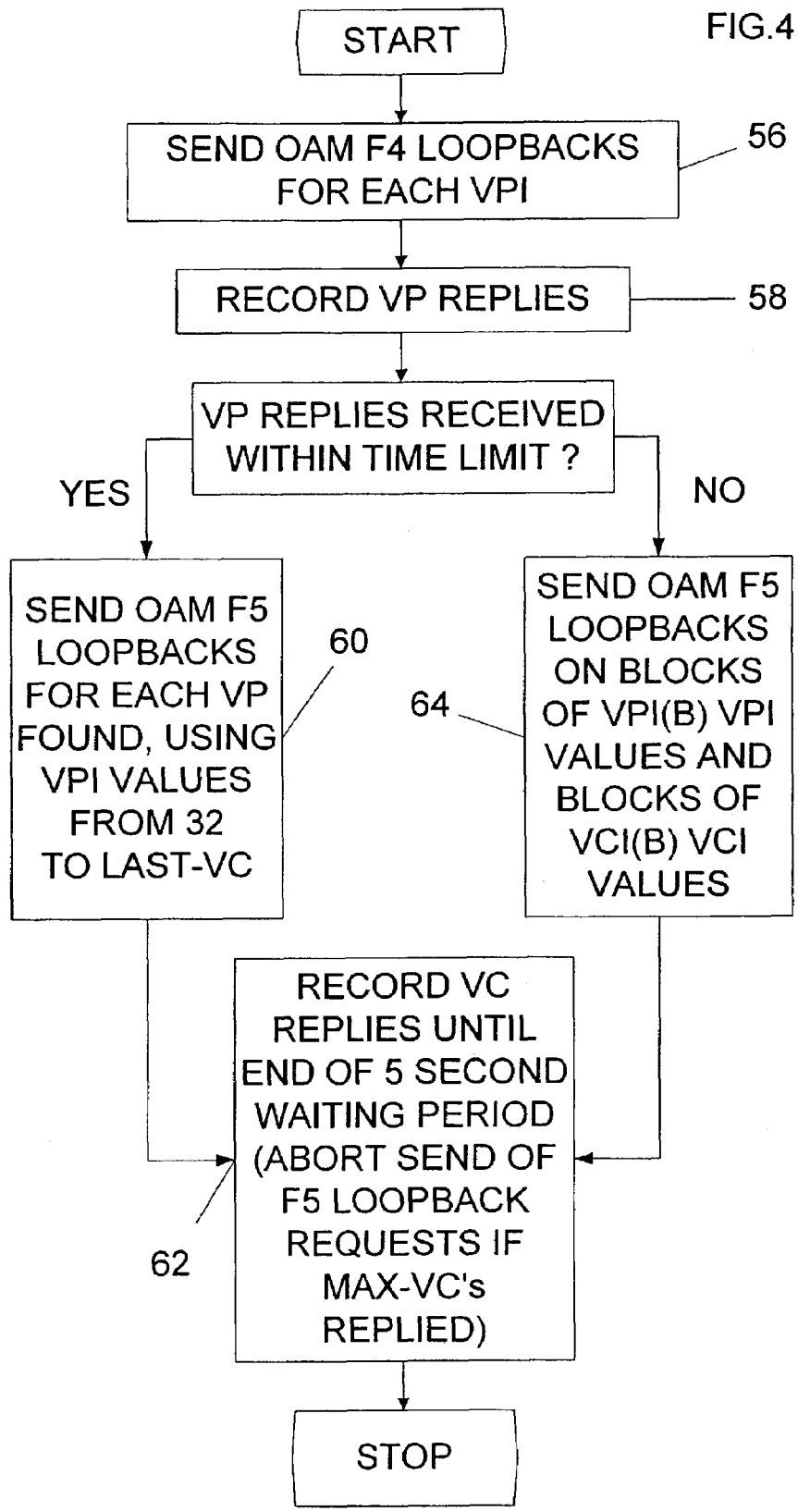

AUTO ATM-VC DETECTION FOR ATM NETWORK ACCESS DEVICES

CROSS-REFERENCE TO RELATED APPLICATION

This application is a continuation-in-part of PCT patent application serial number PCT/CA00/01418, filed on Nov. 29, 2000, and claims priority under 35 U.S.C. § 365 (c) of PCT patent application serial number PCT/CA00/01126.

FIELD OF THE INVENTION

The invention relates to the configuration of Asynchronous Transfer Mode (ATM) Network Access Devices (NAD's), and more specifically, to the detection of active ATM Virtual Channels (VC's) on ATM connections to remote Network Access Concentrators (NAC's).

BACKGROUND OF THE INVENTION

In order to configure a NAD located at the network end-user (or customer) premises to recognize at least one VC address (comprising a Virtual Path Indicator and Virtual Channel Indicator or VPI/VCI) to be used for traffic between the NAD and a remote NAC across an ATM link, it is currently necessary to obtain the list of VPI/VCI addresses corresponding to active VC's from the system administrator of the remote NAC. These VPI/VCI addresses are then either installed in the NAD during its manufacture or are specified by the end user using a configuration interface for the NAD once at the customer premises.

Most customers do not need to be aware of what VC's are being used by their NAD and therefore, do not wish to be directly involved in the configuration of the said NAD. These customers would prefer plug-and-play convenience "out of the box".

Furthermore, with most Incumbent Local Exchange Carriers (ILEC's) currently providing ATM-enabled point-to-point Digital Subscriber Line (xDSL) services, VC's tend to be 'hardcoded' to a single set of VC addresses on a per ILEC basis. This hardcoding occurs at both the ILEC's DSL Access Multiplexor (DSLAM, or NAC, typically located at an ILEC's Central Office, or CO) and the Customer Premises (NAD) ends of an Asymmetric-DSL (ADSL) connection. With the entry of Competitive Local Exchange Carriers (CLEC's) in the Central Offices, it is foreseen that more sophisticated ATM VC management practices will be necessary. Specifically, VC addresses will not remain statically global to an entire ILEC or CLEC's xDSL user community.

Given that the 8-bit VPI and 16-bit VCI portions of a VC's address allow for over 16 million possibilities, it is not possible to test all 16 million possibilities within a reasonable time frame, a strategy designed to cover the most likely VPI/VCI possibilities in a minimal amount of time is necessary.

It is known that DSLAM vendors tend to limit their supported VC addresses to a specific range in order to reduce the amount of memory resources needed. For example, Alcatel limits the VPI range from 0 to 15, and the VCI range from 0 to 1023.

Therefore, there is a need to provide a configuration scheme which will allow the automatic detection of supported VC addresses on an ATM link between a local NAD and a remote NAC located at the network service provider in a minimal amount of time.

SUMMARY OF THE INVENTION

Accordingly, an object of the present invention is to provide an efficient and automatic detection scheme for VC addresses which will save time and money by allowing manufacturers not to have to customize the firmware in each NAD destined for particular ILEC's/CLEC's.

It is another object of the present invention to improve the end-user's experience by providing "out of the box" plug-and-play convenience in the NAD.

It is still another object of the present invention to let the VC scanning algorithm take advantage of the fact that the DSLAM may severely limit the actual number of VPI/VCI addresses supported, hence reduce the range of VC addresses to be tested.

It is another object of the present invention to provide a method, a system, a computer product and a carrier-wave signal which enable a user to automatically detect valid VC addresses.

According to a first broad aspect of the present invention, there is provided a method of configuring a Customer Premises Equipment (CPE) Network Access Device (NAD) to recognize at least one Virtual Channel (VC) address to be used for traffic between the NAD and the remote Network Access Concentrator (NAC) over an ATM link. The method comprises: sending a plurality of pings to the NAC from the NAD, the pings comprising a prompt for the NAC to reply to the pings; receiving and recording at least one response to the pings at the NAD, the response comprising an indication of a VC used to send the response; determining the VC address to be used for traffic using the indication in the at least one response.

Preferably, sending a plurality of pings comprises sending a plurality of pings to a plurality of VPI's.

Preferably, sending a plurality of pings comprises, when no response from the VPI's is received, sending a plurality of pings to a block of VCI's on a block of VPI's.

Preferably, sending a plurality of pings comprises sending a plurality of pings to a block of VCI's on a block of VPI's.

Preferably, the plurality of pings is a plurality of OAM F4 loopbacks.

According to a second broad aspect of the present invention, a system for configuring a Customer Premises Equipment (CPE) Network Access Device (NAD) to recognize at least one Virtual Channel (VC) address to be used for traffic between the NAD and the remote Network Access Concentrator (NAC) over an ATM link is provided. The system comprises: a ping generator for sending a plurality of pings to the NAC, the pings comprising a prompt for the NAC to reply to the pings; a response receiver for receiving and recording at least one response to the pings at the NAD, the response comprising an indication of a VC used to send the response; a VC address analyzer for determining the VC address to be used for traffic using the indication in the at least one response.

According to a third broad aspect of the present invention, there is provided a computer program comprising code means adapted to perform all steps of the present invention, embodied on a computer readable medium.

According to a fourth broad aspect of the present invention, there is provided a computer program comprising code means adapted to perform all steps of the present invention, embodied as an electrical or electromagnetic signal.

According to another broad aspect of the present invention, there is provided a VC discovery mechanism that attempts to detect active VP's and pings (tests) only VC's on these VP's. If there are no VP replies, it pings VC's to a limited VCI depth covering the entire VP range The maximum predetermined range of VC's to ping (MAX-PING) and the network line speed determines the overall amount of time required by this procedure.

Preferably, the maximum number of VC's to ping (MAX-PING) is scaled using the actual transmission speed and an upper limit for the attainable speed. This serves to keep the time required to ping MAX-PING VC's relatively constant.

For the purpose of the present invention, the following terms are defined below.

The term "Virtual Channel (VC)" is intended to mean an ATM bi-directional flow of data over a physical link (such as xDSL). This data flow is uniquely specified (or addressed) by a VPI/VCI pair. One link can support over 16 million VC's (VPI=0 to 255 and VCI=0 to 65535).

The term "Virtual Path (VP)" is intended to mean a logical "bundle" of VC's over a physical link, and is uniquely specified (or addressed) by a VPI. One ATM link can support up to 256 VP's (VPI=0 to 255), each capable of containing up to 65536 VC's.

The term "Virtual Path Indicator (VPI)" is intended to mean the first 8 bits of a VP's or VC's address.

The term "Virtual Channel Indicator (VCI)" is intended to mean the last 16 bits of a VC address.

The term "ATM Operation And Maintenance protocol (OAM)" comprises such protocols as the VP-addressed loopback (F4), and VC-addressed loopback (F5).

The term "ping" corresponds to the process of sending a request, such as, either a VP loopback (F4), or a VC loopback (F5) and receiving a reply from the NAC at the other end of the ATM connection.

The term "Incumbent Local Exchange Carrier (ILEC)" refers to classic telephone service companies.

The term "Central Office (CO)" is intended to mean the Telephone Company's local switching office, a typical location for xDSL terminating/concentrating equipment.

The term "Competitive Local Exchange Carrier (CLEC)" is intended to mean the new businesses that sell Internet Connectivity (and eventually voice channels), using ILEC CO's and telephone wiring.

The term "Network Service Provider" herein refers to any ATM network service provider (such as ILEC's and CLEC's providing xDSL services).

The term "Digital Subscriber Line (xDSL)" is intended to mean the family of Digital Subscriber Line technologies, which currently includes ADSL, HDSL, HSDL2, IDSL, SDSL, SHDSL.

The term "Digital Subscriber Line Access Multiplexor (DSLAM)" is intended to mean the xDSL line terminating equipment at the CO.

The term "Customer Premises Equipment (CPE)" is intended to mean communications equipment that resides on the customer's premises.

The term "upstream speed" is intended to mean the CPE transmission rate in bits per second.

The term "downstream speed" is intended to mean the CPE reception rate in bits per second (different from the upstream rate for some DSL's such as ADSL).

The term "Network Access Device" is intended to mean any network modem, bridge or router capable of connecting to a remote network across an ATM-enabled connection (including xDSL lines such as ADSL and SHDSL).

The term "Network Access Concentrator (NAC)" is intended to mean any remote multi-ATM line terminating/concentrating equipment (for the case of xDSL, this corresponds to DSLAM's).

The term "ATM SAR" is intended to mean the ATM Segmentation And Reassembly (send and receive) module of the NAD.

BRIEF DESCRIPTION OF THE DRAWINGS

These and other features, aspects and advantages of the present invention will become better understood with regard to the following description and accompanying drawings wherein:

FIG. 4 is a flow chart of the detailed steps of the preferred embodiment.

DETAILED DESCRIPTION OF THE PREFERRED EMBODIMENT

Figure 1:
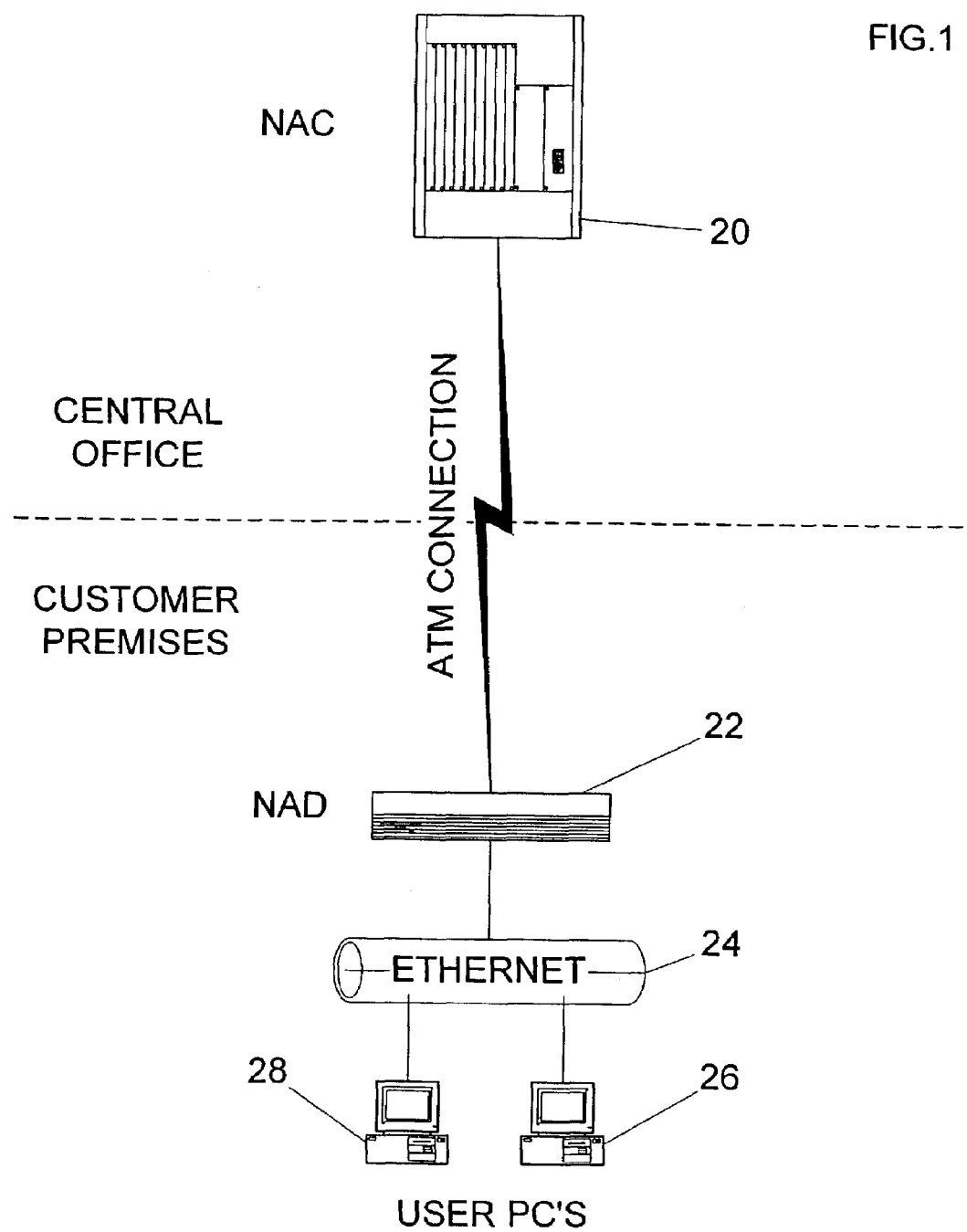
FIG. 1 is a block diagram of the main components of the system.

As shown in FIG. 1, the NAC 20 located at the Central Office is accessible to users 26 and 28 through an NAD 22. The users 26 and 28 are connected, using network cards, to an Ethernet network 24, which is in turn connected to the NAD 22. Through the ATM connection, the NAD 22 communicates with the NAC 20.

Figure 2:
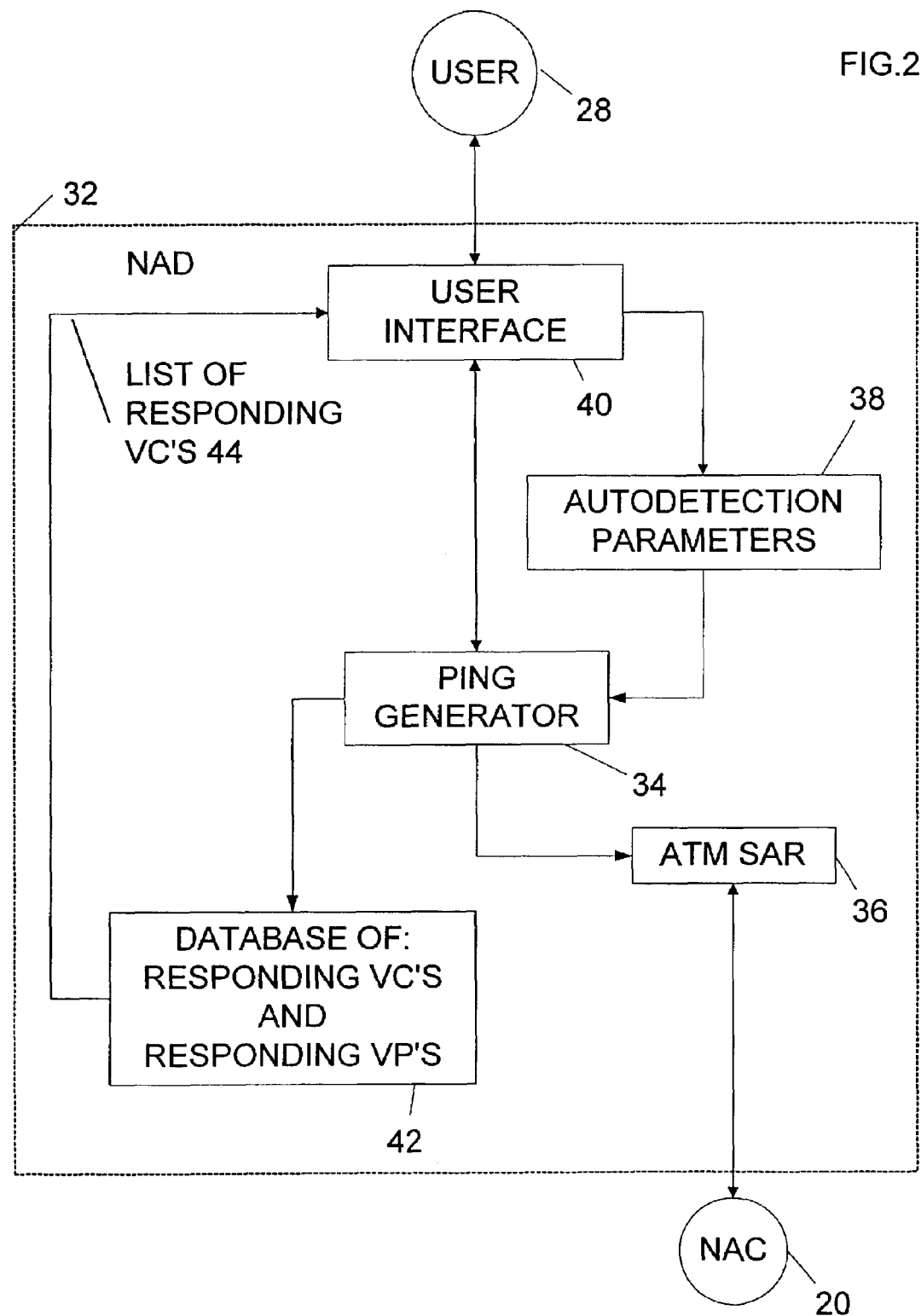
FIG. 2 is a block diagram of the preferred embodiment of the present invention.

In FIG. 2, the NAD's auto ATM VC detection module 32 is shown in detail using a block diagram. This module functions independently of the regular operations carried out by the NAD. This module can be started by a number of user actions such as connecting the NAD to the network (auto start), or by accessing the user interface (manual start), etc.

In order to follow the sequence of events generated by the auto ATM VC detection module, it is necessary to summarize how the tools used to carry out a few key steps are used. A ping is essentially an Operation And Maintenance protocol (OAM) end-to-end loopback packet which can be sent across the physical layer addressed to either a VP (OAM F4 loopback) or a VC (OAM F5 loopback), on the NAC.

Here is the time line for a ping operation:

| NAD | | NAC |
|---|---|---|
| Send loopback request, start 5 second timer | >>> | |
| Loopback successful, cancel timer | <<< | Send loopback reply |
| 5 second timeout, loopback failed | <<< | |

The preferred embodiment of the present invention makes use of these loopbacks to discover which VC addresses are supported by the ATM link. When the user interface 40 is launched by the user, the discovery process begins. The ping generator 34 is prompted to begin auto-detection. The ping generator 34 prepares sequences of OAM F4 and F5 loopback requests and sends them to ATM SAR 36 which sends them to the NAC on the ATM link. If responses are received, they are received by ATM SAR (packet sender/receiver) 36 which then notify the ping generator 34 to update the database of responses received. The ping generator 34 can then generate a further set of requests using the information contained in the database of responses received 42. From the user interface 40, different parameters 38 can be modified such as the delay to receive responses from the DSLAM, the maximum number of supported VC's on the link, the maximum number of VC's to ping, the maximum number of VC's to discover, etc. These parameters are used by the ping generator 36. From the user interface 40, it is also possible to confirm (save permanently) selected VC addresses 44 from the database of responses received 42.

Figure 3:
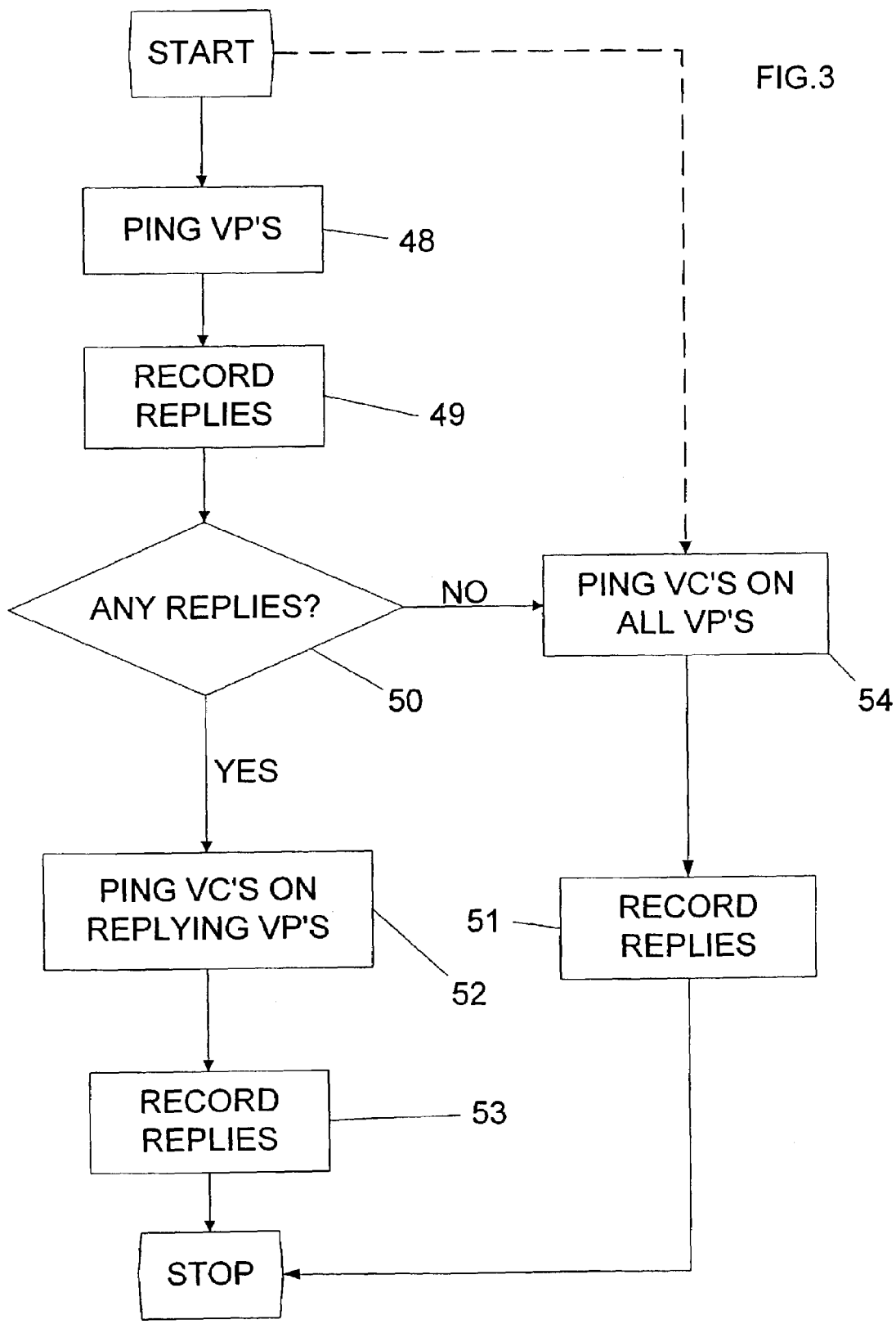
FIG. 3 is a flow chart of the main steps of the preferred embodiment.

The methodology used by the ping generator 34 will now be explained. FIG. 3 shows a summary of the steps carried out according to a preferred embodiment. A first check is made to detect active VP's 48. If VP ping replies are received 50, information concerning these active VP's is stored and used to ping a range of VC's located within just these VP's 52. Alternatively, a range of VC's on all VP's 54 can be pinged to locate active VC's. A facultative step of verifying if any VP responses have been received 50 can be introduced before the alternative of pinging a range of VC's on all VP's 54. It should be noted that although a simple pinging of all possible combinations of VC's and VP's could be done, a preferred algorithm is used to locate the supported VC's in a minimal amount of time.

With reference to FIG. 4, a detailed algorithm to be used by the ping generator will now be illustrated.

Check for the Existence of Any VP's:

Send OAM F4 loopbacks for each VPI (0 to 255), step 56

Record all VP responses, step 58

After issuing last loopback, wait 5 seconds or any appropriate delay, recording any VP responses, step 58

If FOUND-VP Replies are Received, Ping VC's within Each VP:

Send OAM F5 loopbacks on each found VPI, using VCI values from 32 (the first "user" VCI) to an upper VCI limit LAST-VC preferably defined as MAX-PING/FOUND-VP+ 32 (limited to 65535), step 60

Record all VP responses, step 62

If the maximum # of supported VC's reply, abort sending loopbacks, step 62

If all loopbacks were sent, wait 5 seconds or an appropriate delay, recording all VC responses, step 62

Otherwise, if No VP Replies Received (OAM F4 Loopback Possibly Not Supported by NAC), Ping VC's on All VP's:

Send OAM F5 loopbacks on blocks of VPIB VPI's at a time, using blocks of VCIB VCI values at a time up to LAST-VC, preferably defined as MAX-PING/256+32 (limited to 65535). For example, assuming VPIB=16 and VCIB=32 ping VCI's 32 to 63 on each VPI 0 to 15, followed by VCI's 64 to 96 on VPI's 0 to 15, repeat until LAST-VC pinged, then repeat by pinging VCI's 32 to 63 on each VPI 16 to 31, etc., until VPI block 240 to 255 pinged, step 64.

Record all VC responses, step 62

If the maximum # of supported VC's reply, abort sending loopbacks, step 62.

If all loopbacks were sent, wait 5 seconds or any appropriate delay, recording all VC responses, step 62.

The preferred sequence of VPI/VCI addresses to ping in the case where all VC's on all VP's must be pinged (assuming VPIB=16 and VCIB=32) is as follows:

| VPI Range | VCI Range |
|---|---|
| 0-15 | 32-64 |
|  | 65-96 |
| . | . |
| . | . |
| . | . |

-continued

| VPI Range | VCI Range |
|---|---|
| . | . |
| . | . |
| . | . |
| 0-15 | . . . –LAST-VC |
| 16-31 | 32-64 |
| . | . |
| . | . |
| . | . |
| 16-31 | . . . –LAST-VC |
| . | . |
| . | . |
| . | . |
| 240-255 | 32-64 |
| . | . |
| . | . |
| . | . |
| 240-255 | . . . –LAST-VC |

Note that this iterative coverage of VPI/VCI addresses starts with the most likely (low) VPI/VCI values and pings to the least likely (high) VPI/VCI values. This approach minimizes the overall procedure time. The values given here for VPIB and VCIB are for illustrative purposes only; any reasonable value for these can be used. In the interest of minimizing the number of pings sent (hence minimize the execution time of this procedure), VPIB should be a divisor of 256, and VCIB should be a divisor of LAST-VC.

With ADSL technology, for a MAX-PING of 65536 VC's, sequentially pinging these VC's requires approximately 41 seconds at full rate ADSL upstream speed (at 864000 bits per second, or 864 kbps), and 59 seconds for G.Lite ADSL (512 kbps). These numbers apply to NADs that are located no more than approximately 10000-12000 feet from the NAC (ADSL DSLAM). Since the attainable ADSL upstream line speed drops significantly for ADSL line lengths over 12000 feet, and that many users are expected to be located at such long line lengths, the auto-detection method must ping for VC's as efficiently as possible.

Preferably, the sequential "pinging" of up to MAX-VC=65536 VC's, takes about 41 seconds with full-rate ADSL (wherein the actual upstream or transmission speed ACTUAL-TX-SPEED is approximately 860 kbits/sec).

Most ADSL service providers only allow the user transmission at much lower speeds (such as ACTUAL-TX-SPEED=128 and 160 kbits/sec, for example). At these speeds, the time it takes the ping algorithm to complete grows to several minutes.

It is therefore possible to scale the value of MAX-VC based on the actual transmit speed (ACTUAL-TX-SPEED) and an upper limit attainable speed (ATTAINABLE-TX-SPEED is theoretically 1024 kbits/sec for ADSL, and would be 2048 kbits/sec for SHDSL):

$$SCALED-MAX-VC = \frac{PREDETERMINED-MAX-VC * ACTUAL-TX-SPEED}{ATTAINABLE-TX-SPEED}$$

This ensures that the time taken to ping a MAX-VC number of VC's remains fairly constant, at approximately 1 minute, even though ACTUAL-TX-SPEED may vary. This scaled MAX-VC is then used by both ping strategies.

In the case of other ATM-managed xDSL technologies (such as SHDSL), where the upstream speed is much higher (~2000 kbps), this algorithm can ping a greater range of VC's in the same time frame as ADSL. Thus, the maximum predetermined range of VC's to ping (MAX-PING) and the physical upstream line speed determines the overall amount of time required by the NAC with this procedure.

With ADSL technology, some providers currently supply end users with multiple VC's per connection. Therefore, router and bridge ADSL products supporting this auto-detection scheme could support a maximum number of VC's per user (MAX-VC). The detection method is therefore configurable to run until it discovers any number of VC's up to MAX-VC, or pings MAX-PING user VC's.

It should be noted that the first step of the algorithm uses the replies obtained from the NAC to rapidly determine which VC's are active. For example, if the number of active VC's is known to be three (MAX-VC=3), and two VP responses are received following the F4 loopbacks, only VC's on the VP's corresponding to the two F4 loopback replies need be pinged, which can be automatically stopped as soon as the NAC replies to the NAD on three VC's. The procedure also takes advantage of the fact that it is configured to scan up to MAX-PING VC's, and hence scan to a much greater VCI depth on just the two VP's, than it would if scanning all 256 VP's.

A preferred embodiment of the User Interface (UI) to be used in conjunction with the present invention make use of a browser available at the user station. Preferably, a progression bar is displayed which indicates the progression of the VC auto-detection process. Then, a valid VPI/VCI combination is displayed after having been confirmed to be valid or obtained by the auto-detection process. Alternatively, a list of VPI/VCI combinations can be displayed (either preset with original configuration and verified to be valid or obtained through the auto-detection process), one of the combination can be selected or a potential combination to be used can be entered manually by the user. If a new combination is entered a "re-detect" button should be displayed to ensure that the proposed combination is valid.

The following is a UI algorithm to use with the auto-detection scheme for ATM VC's. It details the steps performed to manage, present, and request information required to establish a correct connection to the Internet, using the auto-detection scheme.

The Variables used in the algorithm are as follows:

```
VC_LIST: list of VC's, determined by their VPI/VCI
VC_SELECTED: one VC, selected by the user.
VC_DETECT: Process, which possibly detects ATM VCs
BEGIN
Launch VC_DETECT process
The user starts the UI
If the VC_DETECT process has found at least one entry
    Store entry in VC_LIST
    Else (no entries)
    UI displays a waiting message (auto-detecting in progress...)
    A timer 68 is shown to give an idea of the completion level of the
    autodetection
        Wait for VC_DETECT to find at least one entry or run to completion
        If VC_DETECT finds an entry
            Store entry in VC_LIST
If there is at least one entry in VC_LIST
    Propose the fist entry in VC_LIST to the user.
    The user has a choice to accept or find more entries
If the user chooses to find more entries or VC_LIST is empty
    If VC_DETECT is not finished
        UI Displays a "please wait" message
        Wait until (VC_DETECT) finds all possibilities
        Store VC_DETECT output in VC_LIST
    UI Displays VC_LIST
    On the UI, the user has a choice of selecting one VC, or the choice to
    enter his own values.
```

-continued

```
In the case that VC_LIST is empty, the user must enter his own
values
    Assign selection to VC_SELECTED
Else (the user chooses not to find more entries and VC_LIST is not
empty)
    Assign the first entry of VC_LIST to VC_SELECTED
END
```

The results are in VC_SELECTED.

It should be noted that the present invention can be carried out as a method, can be embodied in a system, a computer readable medium or an electrical or electro-magnetical signal.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method of configuring a Customer Premises Equipment (CPE) Network Access Device (NAD) to recognize at least one Virtual Channel (VC) address having a Virtual Path Indicator (VPI) and a Virtual Channel Indicator (VCI) to be used for traffic between the NAD and the remote Network Access Concentrator (NAC) over an ATM link, the method comprising:

sending a first plurality of pings to said NAC from said NAD, said pings comprising a prompt for said NAC to reply to said pings;

receiving and recording at least one first response to said first plurality of pings at said NAD, each said first response comprising an active VPI of an active VC used to send said response;

sending a second plurality of pings to a block of VCI's on said active VPI;

receiving and recording at least one second response to said second plurality of pings at said NAD, each said second response comprising a VCI of said active VC used to send said response;

determining said VC address to be used for traffic using said VPI and said VCI of said active VC used in said at least one first response and said at least one second response.

2. A method as claimed in claim 1, wherein said sending a first plurality of pings comprises sending a first plurality of pings to a plurality of VPI's.

3. A method as claimed in claim 1, further comprising, when no first response is received, sending a third plurality of pings to a block of VCI's on a block of VPI's.

4. A method as claimed in claim 1, wherein said sending a first plurality of pings comprises sending a first plurality of pings to a block of VCI's on a block of VPI's.

5. A method as claimed in claim 4, wherein said block of VPI's is a block of 16 VPI values and said block of VCI's is a block of 32 VCI values.

6. A method as claimed in claim 4, wherein said sending a first plurality of pings to a block of VCI's on a block of VPI's comprises iteratively sending said first plurality of pings to multiple blocks of VCI's on a block of VPI's and iteratively sending said first plurality of pings to multiple blocks of VPI's.

7. A method as claimed in claim 4, wherein said block of VPI's is a block of 16 VPI values and said block of VCI's is a block of 32 VCI values.

8. A method as claimed in claim 5, further comprising steps of defining a predetermined maximum number of VC's to discover, defining a last VC value by dividing said predetermined maximum number of VC's by 256 and aborting said sending a second plurality of pings when said last VC value is attained.

9. A method as claimed in claim 8, wherein said sending a second plurality of pings is done according to the following blocks of VPI and VCI ranges:

| VPI Range | VCI Range |
|---|---|
| 0-15 | 32-64 |
| . | 65-96 |
| . | . |
| . | . |
| . | . |
| . | . |
| 0-15 | . . . -LAST-VC |
| 16-31 | 32-64 |
| . | . |
| . | . |
| . | . |
| 16-31 | . . . -LAST-VC |
| . | . |
| . | . |
| 240-255 | 32-64 |
| . | . |
| . | . |
| 240-255 | . . . -LAST-VC |

10. A method as claimed in claim 8, wherein said defining a predetermined maximum number of VC's to discover comprises
   determining an ideal maximum number of VC's to discover;
   determining an actual transmission speed over said ATM link;
   determining an attainable transmission speed over said ATM link; and
   defining said predetermined maximum number of VC's to discover by multiplying said actual transmission speed by said ideal maximum number of VC's to discover and dividing by said attainable transmission speed.

11. A method as claimed in claim 1, wherein said first plurality of pings is a plurality of GAM F4 loopbacks.

12. A method as claimed in claim 1, wherein said block of VCI's comprises VCI values from 32 to an upper VCI limit.

13. A method as claimed in claim 12, further comprising steps of defining a predetermined maximum number of VC's to ping and recording a total number of active VPI and wherein said upper VCI limit is the result of the division of said predetermined maximum number of VC's to ping by a total number of active VPI found.

14. A method as claimed in claim 1, further comprising steps of defining a maximum number of supported VCI and aborting said receiving and recording at least one second response step if a total of responses received to said second plurality of ping equals said maximum number of supported VCI.

15. A method as claimed in claim 1, further comprising steps of defining a waiting delay and aborting said receiving and recording at least one second response step if said waiting delay has elapsed.

16. A computer program comprising code means adapted to perform all steps of claim 1, embodied on a computer readable medium.

17. A system for configuring a Customer Premises Equipment (CPE) Network Access Device (NAD) to recognize at least one Virtual Channel (VC) address having a Virtual Patch Indicator (VPI) and a Virtual Channel Indicator (VCI) to be used for traffic between the NAD and the remote Network Access Concentrator (NAC) over an ATM link, the system comprising:
   a ping generator for sending a first plurality of pings to said NAC, said pings comprising a prompt for said NAC to reply to said pings and a second plurality of pings to a block of VCI's on an active VPI;
   a response receiver for receiving and recording at least one first response to said first plurality of pings at said NAD, each said first response comprising said active VPI of an active VC used to send said response and at least one second response to said second plurality of pings at said NAD, each said second response comprising a VCI of said active VC used to send said response;
   a VC address analyzer for determining said VC address to be used for traffic using said VPI and said VCI of said active VC used in said at least one first response and said at least one second response.

18. A computer program comprising code means adapted to, when loaded in a computer, embody the system of claim 17, embodied on a computer readable medium.

* * * * *